Figure 5:
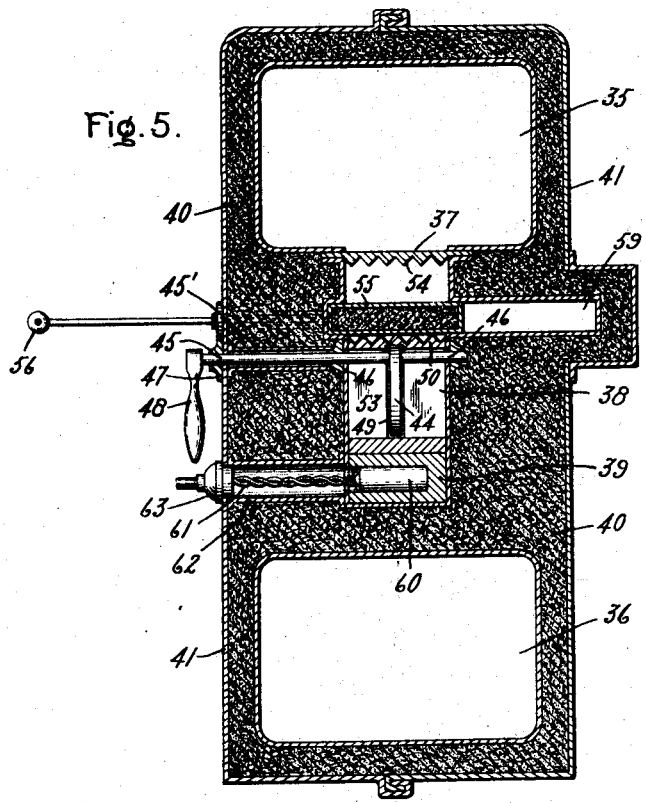

W. STANLEY.
HEATING DEVICE.
APPLICATION FILED APR. 29, 1912.
1,044,284.
Patented Nov. 12, 1912.
2 SHEETS—SHEET 1.
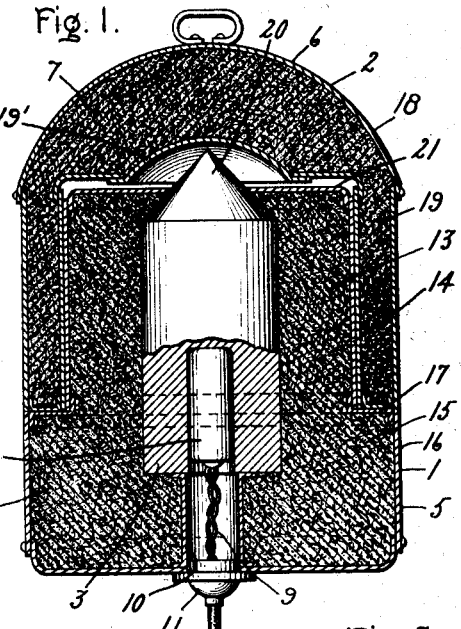
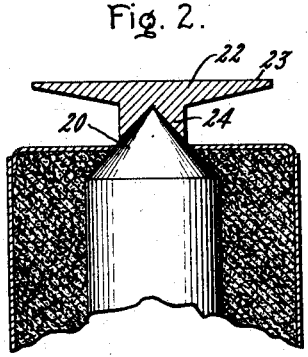
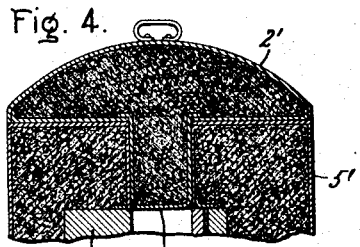
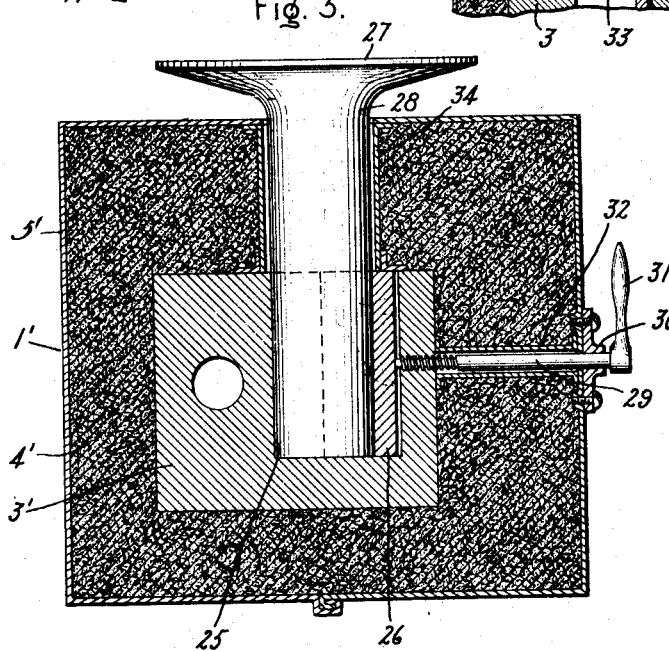
Witnesses:
Earl G. Klock.
J. Elli Elen.
Inventor:
William Stanley,
by
His Attorney

W. STANLEY.
HEATING DEVICE.
APPLICATION FILED APR. 29, 1912.

1,044,284.

Patented Nov. 12, 1912.

2 SHEETS—SHEET 2.

Witnesses:
Earl G. Klock
J. Ellis Glen

Inventor:
William Stanley,
by
His Attorney.

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

HEATING DEVICE.

1,044,284.  Specification of Letters Patent.  Patented Nov. 12, 1912.

Application filed April 29, 1912. Serial No. 693,965.

*To all whom it may concern:*

Be it known that I, WILLIAM STANLEY, a citizen of the United States, residing at Great Barrington, county of Berkshire, State of Massachusetts, have invented certain new and useful Improvements in Heating Devices, of which the following is a specification.

My invention relates to heating devices of the type in which heat is stored for an extended period in an insulated mass having high heat storage capacity and utilized intermittently for operations such as cooking, heating and the like.

More particularly my invention relates to devices of the nature disclosed in my Patent No. 1,025,843. In such devices heat is stored electrically in a mass of material such as iron having high heat storage capacity and the heat thus stored is transferred when desired from the storage mass to the point of use through a path having high thermal conductivity.

It is essential in heat storage devices that the storage mass be very efficiently insulated to prevent loss of heat by conduction and radiation to the surrounding atmosphere. At such times as the apparatus is being utilized for heating or cooking, it is essential in most cases that the heat be conducted rapidly to the body to be heated. In my patent hereinbefore referred to, I have disclosed broadly a means for securing these results. This means comprises what I term a "thermal switch" and consists of a block of material having high thermal conductivity through which the heat from the storage mass may be rapidly transferred to the body which is to be heated. In the aforesaid patent, the thermal switch specifically disclosed normally constitutes a portion of the heat storage mass and when the cooking or other operation is to be performed, the said switch is moved from its normal position to a position of contact with the body to be heated while it still preserves contact with the rest of the storage mass.

The invention covered by the present application also comprises a thermal switch composed of material having high thermal conductivity. However, according to the present invention, during the storage period, the thermal switch is adapted to be removed outside of the insulation which surrounds the storage mass and during the cooking or other operation, a portion of the said insulation is removable to allow the thermal switch to contact with the exposed portion of the storage mass.

The object of my invention is to enable the heat storage mass to be effectively insulated so as to prevent waste of heat. As all portions of the storage mass, except that which is in immediate contact with the thermal switch, are kept well-within the heat insulation this object is attained by means of the present invention.

In the present application, I have disclosed two embodiments of my invention in which the thermal switch is movable and the heat storage mass stationary, the former being adapted to be placed in contact with the latter when desired. I have also disclosed a form in which the thermal switch is stationary and a portion of the heat storage mass movable so that it may be moved into contact with the said thermal switch. However, both of these forms come within my invention which contemplates the provision of a thermal switch which is normally out of contact with the storage mass and is brought into contact therewith during the cooking or other operation. Although in the preferred forms disclosed in the present application, I have shown the thermal switch as constituting a support for the body to be heated, this is not essential to my invention.

My invention will be better understood by reference to the accompanying drawings which show it embodied in several specific forms.

Figure 6:
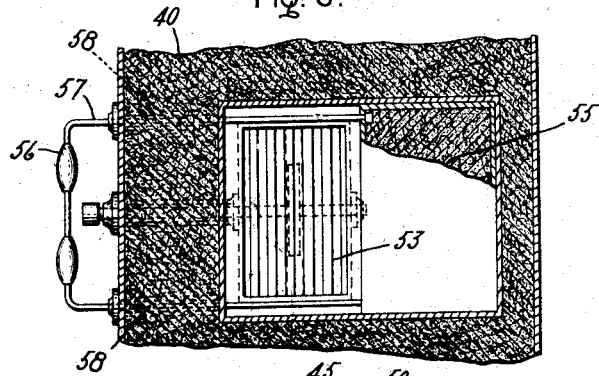
Figure 7:
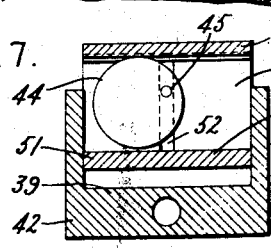

In the drawings, Figure 1 is a vertical section of a stove embodying my invention; Fig. 2 is a partial vertical section showing the cover removed from the stove and the support in contact with the storage mass; Fig. 3 is a vertical section of a modification of my device showing the support in contact with the storage mass; Fig. 4 is a partial vertical section showing the same modification when the cover is in place; Fig. 5 is a vertical section of still another modification of my invention; Fig. 6 is a partial horizontal section thereof showing the cover removed from the storage mass; and Fig. 7 is a detail vertical section of the storage mass.

The stove shown in Figs. 1 and 2 comprises the body portion 1 and the cover 2. The body portion 1 comprises the heat storage mass 3, insulation 4 surrounding the same, and casing 5 inclosing the insulation. Lamp black, powdered silica, infusorial earth or any other suitable insulation may be used. The casing 5 is preferably of sheet metal. The cover 2 is preferably a sheet metal shell 6 filled with suitable heat insulation 7 which may be the same as 4. Heat storage mass 3 is provided with an electrical heating unit 8 which has conductors 9 leading thereto through conduit 10 extending through the insulation 4. Cap 11 may be provided for the said conduit.

As shown in Fig. 1, that portion 13 of the heat insulation 4 and that portion 14 of the casing 5 surrounding the upper part of the heat storage mass 3 are of a less diameter than those portions 15 and 16 surrounding the lower part thereof. A seat 17 for the cover 6 connects the parts 14 and 16 of the casing. The cover 2 consists of an upper dome portion 18 and a downwardly extending portion 19 which engages the seat 17. By reason of the irregular and extended line of division between the cover and body portion, the escape of heat between the same is very slight. To aid in the prevention of the escape of heat, that portion 19' of the shell of the cover which is immediately over the storage mass may be of polished metal. The storage mass 3 extends slightly above the top of the body portion 1. This portion of the heat storage mass may be of any desired shape but is preferably of such shape that it will hold a support in definite position thereon and in good thermal conductive relation therewith. The shape should also be such that a maximum area of contact between the storage mass and support may be secured and a minimum amount of radiation will occur when the support is removed. As shown at 20 it may be conical. Preferably the casing for the body portion of the stove extends inwardly to form the top 21. This top as well as the upper part 14 of the casing and the seat 17 are of metal having high specific heat resistance so as to minimize the conduction of heat from the storage mass. The metal described in a certain Dempster Patent No. 901,428 may be used for this purpose. Such a metal may also be used for the inner wall of the downwardly extending portion 19 of the cover as well as for the conduit 10. The support 22 for bodies to be heated has preferably a flat upper surface 23 and the portion 24 of the lower surface thereof, which is adapted to contact with the heat storage mass, should be complementary to the upper surface of the heat storage mass so as to contact intimately with the same.

The modification shown in Figs. 3 and 4 consists of a body portion 1' and cover 2'. The body portion 1' comprises the heat storage mass 3' surrounded by heat insulation 4' and casing 5'. The heat storage mass 3' has a recess 25 therein. Within this recess is located a movable part 26 of the storage mass. The support 27 has preferably a flat upper surface and a central downwardly extending cylindrical portion 28 which is adapted to enter the opening 25 in the storage mass. This support may be clamped to the storage mass by means of the screw spindle 29 the inner threaded end of which engages a thread formed in the storage mass 3' and the outer end of which is journaled in a bearing 30 and is provided with the operating handle 31. Sleeve 32 for the spindle 29 extends through the insulation 4'. The inner end of the said spindle may be forced against the movable part 26 to clamp the support 27 to the storage mass. Owing to the shape and location of the recess 25, a large area of contact between the storage mass and support may be secured and a comparatively small amount of radiation will take place when the support is removed. In Fig. 4 the cover 2' is shown, consisting of an upper dome shaped portion adapted to rest upon the top of the body portion of the stove and a central downwardly extending portion which is adapted to be inserted into the recess 25 in the storage mass when the support 27 is removed therefrom. The shell 33 of the said downwardly extending portion may be of metal having high specific heat resistance. The throat 34 of the body portion leading to the storage mass, the sleeve 32 and the spindle 30 may also be of such metal.

In the use of either of the above described devices heat is normally stored in the heat storage mass and owing to the effective heat insulation this may be done with a minimum expenditure of electric energy. When it is desired to utilize the device, the cover may be removed from the same. In the case of the stove shown in Figs. 1 and 2 the support 22 may be then placed upon the storage mass and a close contact secured by reason of the shapes of the respective parts. In the case of the stove shown in Figs. 3 and 4 the support 27 after being inserted in the opening in the heat storage mass may be clamped thereto by turning handle 31. Owing to the excellent heat conductivity of the supports and the storage masses and the close contact between the same heat will be very rapidly transferred to bodies which may be placed upon the said supports.

Figs. 5, 6 and 7 show a range in which is embodied a further modification of my invention. The said range comprises the upper and lower receptacles or ovens 35 and 36. These may be constructed of sheet or cast metal. In the bottom of the oven 35 is mounted the support 37 adapted to hold bodies which are to be heated rapidly and at a high temperature. The support 37 is preferably a block of iron or other material having good thermal conductivity. Immediately below the support 37 and co-extensive therewith is located a chamber 38. This chamber is adapted to hold the heat storage mass 39. The walls of this chamber are preferably composed of metal having high specific heat resistance. The receptacles 35 and 36 and the chamber 38 may be surrounded by suitable heat insulation 40 which may be inclosed by casing 41 preferably of sheet metal. The heat storage mass 39 as best shown in Fig. 7 comprises a stationary portion 42 and a movable portion 43. The latter is adapted to be elevated by means of the disk 44 which is eccentrically mounted by means of the spindle 45 in bearings 46 on the walls of chamber 38. The spindle 45 extends through sleeve 45′ in the insulation 40 to bearing 47 on the outside of the casing 41. The said spindle may be provided with operating handle 48. Slot 49 is formed in the storage mass 43 for the reception of the disk 44. This slot is of a height somewhat less than that of the part 43 leaving the top 50 and bottom 51 of the same intact. The axis of rotation of the disk 44 is slightly below the lower surface of the top 50 and the said disk is adapted upon rotation thereof to bear against said surface to elevate the part 43 and to support the same when it is not in contact with the stationary part 42. To allow the elevation of the part 43 a slot 52 is formed therein to receive the spindle 45. This slot may be of the same height as slot 49 and at right angles thereto. The upper surface of the top 50 is preferably of such shape as to secure a large area of contact with the support 37. In the drawing I have shown triangular ridges 53 formed in the said top which are adapted to engage with triangular depressions or grooves 54 formed in the bottom of the support 37 when the part 43 is sufficiently elevated. The cover or valve 55 consisting of a metal shell filled with suitable heat insulation is provided for the heat storage mass when the movable part thereof is in its lowest position. This cover or valve is attached to a handle 56 by means of rods 57 which extend through sleeves 58 mounted in the insulation 40. Owing to the fact that the rods 57 are connected to the ends of the cover 55 after the latter is forced into chamber 59 formed in the heat insulation 40, the part 43 of the heat storage mass may be elevated between the said rods. In the bottom of the stationary part 42 of the heat storage mass may be embedded the electrical heating unit 60 to which may be connected conductors 61 passing through conduit 62 which may be provided with cap 63. The sleeves 45′ and 58 and the conduit 62 may be of metal having a high specific heat resistance.

Normally the parts are in the position shown in Fig. 5 and heat is stored in the mass 39 by means of the electrical heating unit 60. In this position heat will be conducted slowly through the insulation to the ovens 35 and 36. When it is desired to furnish heat rapidly and at a high temperature to an external body the cover 55 may be forced into the chamber 59 by means of the handle 56 and the part 43 of the heat storage mass may then be elevated by rotating the eccentrically mounted disk 44 by means of the handle 48. Owing to the fact that the upper surface of the top 50 of the heat storage mass and the lower surface of the support 37 are complementary intimate contact between the same is secured and heat is rapidly conducted to the external body which may be placed upon the support 37. When the heating operation is completed the part 43 may be lowered by suitable rotation of the handle 48 until it is again in its lowermost position. The cover 55 may then be reciprocated into position over the heat storage mass and the escape of heat prevented.

The use of a metal having a high specific heat resistance in the construction of various parts as hereinbefore described is not claimed in this application, the same being claimed in my application Serial No. 678,857, filed February 20, 1912.

Various modifications of the apparatus described will suggest themselves to those skilled in the art and are to be considered as coming within the scope of my invention which is set forth in the following claims.

What I claim as new and desire to secure by Letters Patent of the United States, is:—

1. A heating device comprising a heat storage mass, heat insulating means normally surrounding the same but having a portion thereof removable to expose a portion of the heat storage mass, and a support for bodies to be heated adapted to contact with the exposed portion of the heat storage mass, the contacting surfaces of the said exposed portion and of the said support being provided with means for securing good thermal conduction from the latter to the former.

2. A heating device comprising a heat storage mass, heat insulating means surrounding the same including a heat insulating cover which is removable to expose a portion of the heat storage mass, and a support for bodies to be heated adapted to be brought into intimate contact with the said exposed portion when the said cover is removed.

3. A heating device comprising a heat storage mass, heat insulating means surrounding the same including a cover which is removable to expose a portion of the heat storage mass, a support for bodies to be heated, and means for bringing said support and said exposed portion of the heat storage mass in good thermal conductive relation when the said cover is removed.

4. A heating device comprising a heat storage mass, heat insulation substantially surrounding the same including a cover removable to expose a portion of the heat storage mass and a support composed of material having low thermal resistance adapted to be brought into close contact with said exposed portion of the heat storage mass upon the removal of the said cover.

5. A heating device comprising a heat storage mass, and a thermal switch comprising a support having low thermal resistance and means for securing good thermal contact between said support and said heat storage mass.

6. In a heating device, the combination of a heat storage mass, heat insulation substantially surrounding the same and a thermal switch having high thermal conductivity adapted to contact intimately with the said mass through said insulation, or to be separated entirely therefrom as desired.

7. In an electrically heated device, a heat storage mass, heat insulation substantially surrounding the same, electrical means for heating the said mass and a thermal switch having high thermal conductivity contacting intimately with the said storage mass and separable therefrom.

8. In an electrically heated device, a heat storage mass, heat insulation normally surrounding the same, a passage extending through said heat insulation from said storage mass and a thermal switch having high thermal conductivity adapted to contact through said passage with the said storage mass, or to be separated therefrom when desired.

In witness whereof, I have hereunto set my hand this twenty fifth day of April, 1912.

WILLIAM STANLEY.

Witnesses:
  F. G. LARAMEE,
  M. J. OVERHOLSER.